3,455,840
FLUORINATION CATALYST AND PROCESS FOR
MANUFACTURING THE SAME
Kaoru Kato, Toyonaka-shi, and Shigeyoshi Ogawa, Suita-shi, Japan, assignors to Daikin Kogyo Kabushiki Kaisha, Kata-ku, Osaka-shi, Japan
Filed May 2, 1966, Ser. No. 546,728
Claims priority, application Japan, May 7, 1965, 40/26,771
Int. Cl. B01j 11/78, 11/52; C07c 17/20
U.S. Cl. 252—441    9 Claims

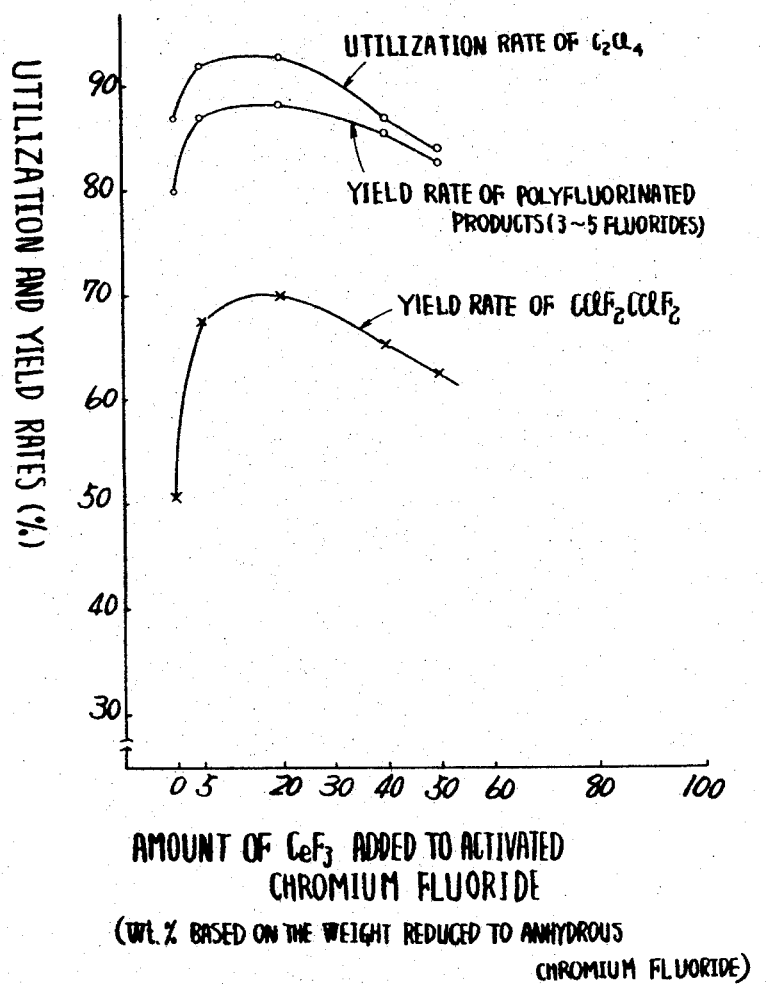

ABSTRACT OF THE DISCLOSURE

An improved fluorination catalyst comprising (1) an activated chrominum oxyfluoride prepared by heating chromium fluoride at from 300° to 750° C. while supplying thereto a continuous stream of a gas mixture containing molecular oxygen and water vapor, said water vapor being supplied in the range of at least 2 wt. percent in total amount based on the weight reduced to anhydrous chromium fluoride and (2) 1 to 50 wt. percent of at least one rare earth compound selected from the group consisting of a rare earth fluoride, rare earth chloride and rare earth oxide, based on the weight reduced to anhydrous chromium fluoride.

---

This invention relates to an improved fluorination catalyst, and a process for preparing the same.

Heretofore it has been known that some halohydrocarbons can be fluorinated by vapor-phase reaction with hydrogen fluoride in the presence of a metallic halide fluorination catalyst. In U.K. Patent No. 690,355 it is disclosed that chromium oxyfluoride is effective in catalyzing such vapor-phase fluorination reaction. Said chromium oxyfluoride has been prepared by heating a hydrated chromium fluoride in the presence of molecular oxygen at an elevated temperature, 350° to 750° C. However, as is disclosed in U.K. Patent No. 821,211, when certain halohydrocarbons are fluorinated with hydrogen fluoride over the chromium oxyfluoride catalyst thus prepared, catalytic activity thereof is markedly reduced in a relatively short time due to carbon deposits on the catalyst, resulting in decreased catalyst life. Although the catalyst of lowered activity may be regenerated by contacting it with oxygen at about 500° C. this requires an interruption of the fluorination process and usually requires up to about 2 hours to regenerate satisfactorily, making its commercial use difficult. Moreover, the employment of said catalyst in fluorination process requires a relatively high temperature if fluorinated products are intended to be obtained in a high yield.

In our co-pending application Ser. No. 521,394, filed Jan. 18, 1966, it is disclosed that an improved fluorination catalyst having higher catalytic activity and longer catalyst-life than those of the conventional chromium oxyfluoride catalysts can be obtained from anhydrous chromium fluoride by heating it at 300° to 750° C. in a continuous stream of a gas mixture containing molecular oxygen and water vapor.

As the results of further investigation by us, it has now been discovered that more excellent fluorination catalysts can be obtained from hydrated and anhydrous chromium fluoride by the process described hereinunder.

An object of the invention is accordingly to provide an improved fluorination catalyst which overcomes the disadvantages of the prior catalysts.

Another object of the invention is to provide a fluorination catalyst which exhibits a markedly higher catalyzing effect in the vapor-phase fluorination reaction of halohydrocarbons with hydrogen fluoride and shows almost no deterioration in the effect after a long period of employment, whereby making it possible to prepare the desired fluorinated hydrocarbons selectively in a high yield even after the catalyst is employed continuously for a long time.

Further object of the invention is to provide a new and useful process for the manufacture of said improved catalyst from a hydrated and anhydrous chromium fluoride.

Above and other objects of the invention will be apparent from the description below.

The improved fluorination catalyst of the invention comprises (1) an activated chromium fluoride prepared by heating a chromium fluoride at from 300° to 750° C. in a continuous stream of a gas mixture containing molecular oxygen and water vapor and (2) 1 to 50 weight percent of one or more of rare earth fluorides, chlorides or oxides, based on the weight reduced to anhydrous chromium fluoride.

The chromium fluoride to be activated in this invention includes anhydrous chromium fluoride and various hydrated cromium fluorides, such as trihydrate, $CrF_3 \cdot 3H_2O$; hemiheptahydrate, $CrF_3 \cdot 3\frac{1}{2}H_2O$; tetrahydrate, $$CrF_3 \cdot 4H_2O$$

hexahydrate, $CrF_3 \cdot 6H_2O$; nonahydrate, $CrF_3 \cdot 9H_2O$; and the like.

The chromium fluoride is preferably activated to prepare the activated chromium fluoride after shaping a mixture thereof with graphite and/or silicon dioxide into desired small pieces, such as tablets, pellets, etc., although it can also be activated singly or after impregnating porous materials, such as active carbon, active alumina, etc. therewith without shaping. The graphite, silicon dioxide or mixtures thereof may be employed in the range of from 1 to 10 weight percent, preferably from 2 to 4 weight percent, based on the weight reduced to anhydrous chromium fluoride. The silicon dioxide employed singly or in admixture with graphite serves to prevent corrosion on the activating reactor and to increase the porosity of the catalyst. The silicon dioxide may be further added to the shaped small pieces containing chromium fluoride to be activated so as to intersperse it among them in the range of less than 40 weight percent, preferably from 5 to 20 weight percent, based on the weight reduced to anhydrous chromium fluoride, thereby preventing corrosion of the reactor and increasing the porosity of the resultant catalyst more effectively.

The activation process to prepare the activated chromium fluoride is carried out in a stream of gas mixture of molecular oxygen and water vapor. Oxygen gas or air may be employed as oxygen source. The ratio of molecular oxygen to the chromium fluoride to be activated varies over a wide range, but it is preferred to employ molecular oxygen in the range of at least 30 cc./hr., particularly from 50 to 150 cc./hr., based on one gram reduced to anhydrous chromium fluoride.

It is essential in the present invention that the gas stream should contain water vapor besides molecular oxygen and that aqueous vapor should be fed in a continuous manner into the activation reaction system, since the desired catalyst having an extended life and a high degree of catalytic activity can not be obtained if water vapor is not fed at all or is fed intermittently. The rate of water vapor to the chromium fluoride is critical in the invention and it is necessary to feed water vapor in the range of at least 2 weight percent, preferably from 6 to 40 weight percent, in terms of the total amount, based on the weight reduced to anhydrous chromium fluoride. A larger amount of water vapor may be employed in the invention without any adverse effect. Even if 300 weight percent of aqueous vapor is employed, for example, the catalytic activity and the catalyst-life are not adversely affected. The gas mixture of molecular oxygen and aqueous vapor may be prepared by various methods, for example, by mixing water vapor with a molecular oxygen-containing gas such as oxygen or air.

An activation temperature of from 300° to 750° C. is applied in the invention. It is preferred to heat the starting chromium fluoride rapidly to about 300° to 400° C., and then gradually raise the temperature to about 650° to 750° C. and maintain such temperature for about 0.5 to 3 hours in order to obtain the catalyst of high activity. The gas mixture which contains molecular oxygen and water vapor is continuously fed from the initial stage of the activation reaction or after heating the system at 300° to 400° C.

The activation reaction is carried out for a time sufficiently long to convert chromium fluoride to the activated chromium fluoride. In general, the activation reaction is completed in a period of about 1 to 4 hours, although more prolonged time may be applicable without adversely affecting the catalytic activity and the catalyst-life.

The activated chromium fluoride thus obtained is confirmed by elementary analysis to be a material comprising three components of chromium fluorine and oxygen and confirmed by X-ray diffraction analysis to be amorphous and to contain no crystalline solid of $Cr_2O_3$, $CrO_3$ and $CrF_3$.

The present fluorination catalyst should contain rare earth fluorides, chlorides or oxides, besides the activated chromium fluoride thus prepared, thereby increasing the catalyzing effect in vapor-phase fluorination reaction of halohydrocarbons with hydrogen fluoride and consequently making it possible to produce the desired fluorinated products selectively in a high yield.

The rare earths include elements ranging from the 58th to 71st element in the Periodic Table, and the rare earth compounds employed in the invention are the fluorides, chlorides and oxides of said rare earth elements and these are employed singly or in admixture with one another.

The amount of the rare earth compounds contained in the present catalyst affects in the catalytic activity thereof, and should be in the range of 1 to 50 weight percent, preferably 5 to 30 weight percent, based on the weight reduced to anhydrous chromium fluoride.

The above fact will be apparent from the accompanying drawing which is the diagram showing the results of fluorination of tetrachloroethylene with hydrogen fluoride in the presence of the catalyst obtained according to Example 1. The fluorination reaction was carried out under the same conditions as the case of the appended Table 1.

From the drawing, even by adding a small amount of cerium fluoride, the utilization rate of the material, tetrachloroethylene, the yield rate of polyfluorinated products (trifluoride, tetrafluoride and pentafluoride) and the yield rate of 1,2-dichloro-1,1,2,2-tetrafluoroethane are raised, the peak of the utilization rate and yield rates being attained when the addition of cerium fluoride reaches 5–30 weight percent based on the weight reduced to anhydrous chromium fluoride, and further addition gradually lowers the curves of both the utilization rate and yield rates.

The present catalyst is obtainable by homogeneously mixing the rare earth compounds with the activated chromium fluorides. In order to prepare the catalyst of a larger pore volume and higher catalytic activity, it is preferred to further admix the mixture of the activated chromium fluorides and rare earth compounds with a suitable polymeric binder, such as polytetrafluoroethylene, polyvinyl chloride, etc., shape the mixture into desired small pieces such as pellets, tablets, etc., and then heat the pieces in an inert gas stream at a temperature sufficiently high to decompose said polymeric binder so as to volatilize the binder from the structure. The temperature and time applied will depend upon the nature of the binder in the structure. When polytetrafluoroethylene is employed as the binder, for example, it is desirable to heat the structure at about 500° C. for 1 to 3 hours in an inert gas stream.

Alternatively, the present catalyst is also obtainable by mixing the rare earth compounds with chromium fluorides to be activated and heating the mixture under the same activating conditions as aforementioned to activate the chromium fluoride. In this case, it is preferred to further admix the mixture of the starting chromium fluorides and rare earth compounds with 0.5 to 10 weight percent, preferably 1 to 5 weight percent, of graphite and/or silicon dioxide on the basis of the total amount of the chromium fluoride and rare earth compound employed, shape the mixture into tablets, pellets or other small pieces, and heat the pieces for activation of chromium fluoride. The rare earth oxides show no change but the rare earth chlorides and fluorides are converted into the rare earth oxides in the course of the activation process.

In either case, however, as the rare earth element is contained in the resultant catalyst in the form of chloride, fluoride or oxide the catalyst of the invention thus prepared displays almost similar high catalytic activity.

The compounds which may be fluorinated using the catalyst of this invention are partially or completely halogenated aliphatic hydrocarbons having from 1 to 4 carbon atoms, no iodine and at least one halogen other than fluorine. The representatives of the compounds are carbon tetrachloride, chloroform, methylene chloride, methylene bromide, methylene chlorobromide, dichlorodifluromethane, chlorodifluoromethane, trichlorofluoromethane, dibromodifluoromethane, hexachloroethane, tetrachloroethane, tetrachloroethylene, 1,1,2-trichloro-1,2,2-trifluoroethane, 1,1,2,2-tetrachloro-1,2-difluoroethane, 1,2-dichloro-1,1,2,3-tetrafluoroethane, 2,2-dichloropropane, 1,1,1-tri-chloropropane, 1,1,1,2,3 - pentachloropropylene, perchlorobutadiene, 2,3 - dichlorohexafluoropropylene, etc. Particularly, the catalyst of this invention is most suitable for the fluorination of tetrachloroethylene with hydrogen fluoride into 1,2-dichloro-1,1,2,2-tetrafluoroethane which is useful as an aerosol propellant, refrigerant, etc.

The fluorination reaction is carried out by passing a vaporized halohydrocarbon to be fluorinated together with hydrogen fluoride or a mixture of hydrogen fluoride and chlorine through a bed of the present catalyst at an elevated temperature. The reaction temperature varies over a wide range according to the reactivity of halohydrocarbons to be fluorinated, activity of the catalyst, contact time, the products desired, and other factors, but a temperature of about 100° to 600° C., preferably about 200° to 450° C., is usually applied in the fluorination reaction. One advantage of the invention is that the fluorinated products desired can be prepared in a high yield at lower temperature than that required in fluorination reaction using the known chromium oxyfluoride catalysts.

The ratio of hydrogen fluoride to halohydrocarbon employed also varies over a wide range according to the product desired, but usually it is advantageous to employ hydrogen fluoride in a theoretical or slightly excess amount. For instance, in fluorinating tetrachloroethylene into 1,2-dichloro-1,1,2,2-tetrafluoroethane, hydrogen fluoride may be preferably employed in the range of at least 4 moles per mole of tetrachloroethylene together with more than 1 mole of chlorine.

Contact time is not critical in this invention and selected from a wide range, but ordinarily it is sufficient in such short time as 1 to 30 seconds. For instance, in fluorinating tetrachloroethylene into 1,2-dichloro-1,1,2,2-tetrafluoroethane, a contact time of less than 5 seconds is usually used with good results. The fluorination reaction of this invention may be carried out under both an atmospheric pressure and superatmospheric pressure.

The gaseous products of the fluorination process may be separated into their component parts by the conventional methods, such as a combination of condensation, distillation, washing, drying and the like procedures.

For fuller understanding of the invention, preferred examples are given below, in which "percent" represents, unless otherwise specified, a "weight percent" based on the weight reduced to anhydrous chromium fluoride, and the specific surface area, pore volume and average radius of pores of the catalysts are determined by the following methods:

Specific surface area is determined by B.E.T. method which comprises measuring the adsorption amount of nitrogen gas to the catalyst at a liquid nitrogen temperature.

Pore volume is determined by the method described in the literature, J. Am. Chem. Soc. 78, 373 (1951).

Average radius of pores is calculated from the pore volume and surface area of the catalyst, all the pores of the catalyst being assumed to be cylindrical.

EXAMPLE 1

Trihydrate of chromium fluoride, $CrF_3 \cdot 3H_2O$, was homogeneously mixed with 2 weight percent of graphite and shaped into tablets, 6 mm. dia. and 6 mm. thick, 700 g. of the resultant tablets were loaded into a 38 mm. inside diameter, 1,000 mm. long transversal quartz tube to give a bed of the chromium fluoride tablets 510 mm. long.

A stream of air which contains water vapor was passed through the bed of the tablets at a rate of 4.4 l./min. The system was rapidly heated to 400° C. in about 20 minutes and the temperature gradually raised to 700° C. in about further 40 minutes, maintained for 60 minutes at such temperature, and then lowered to room temperature. Said stream of air containing water vapor was passed in a continuous and constant manner during the course of the activation reaction and the total amount of water vapor thus passed was 17 weight percent per 2 hours. The resultant activated chromium fluoride thus produced was ground to about 20 to 90 mesh, to which cerium fluoride of 20 to 90 mesh at the rate of 20 weight percent and 3 weight percent of 20 to 90 mesh polytetrafluoroethylene particles were added, and after being homogeneously mixed the mixture was shaped into tablets, 6 mm. dia. and 6 mm. thick. The resultant tablets were placed in a quartz tube, 1,000 mm. long and 38 mm. inner diameter, and heated at 500° C. for 2 hours in a nitrogen stream, whereby the catalyst of the invention was obtained, with the following physical properties:

Specific surface area _____ $m^2/g$__ 11.3
Pore volume _____ cc./g__ 0.0112
Average radius of pores _____ A__ 19.8

EXAMPLE 2

Trihydrate of chromium fluoride, $CrF_3 \cdot 3H_2O$, was homogeneously mixed with 1 weight percent of graphite and 2 weight percent of white carbon and shaped into tablets, 6 mm. dia. and 6 mm. thick.

The tablets were loaded in the same quartz tube in the same manner as in Example 1, except that 7 weight percent of white carbon (silicon dioxide) was interspersed among the tablets thus loaded.

The tablets were then heated in the same manner as in Example 1, except that water vapor was passed through at the rate of 35 to 40 weight percent per 2 hours in total amount. The resultant activated chromium fluoride was pulverized to 20 to 90 mesh, to which 7 weight percent of cerium chloride, $CeCl_3$, of 20 to 90 mesh and 3 weight percent of polytetrafluoroethylene particles of 20 to 90 mesh were added, and the mixture was shaped into tablets, 6 mm. dia. and 6 mm. thick. Said tablets were further heated in the same manner as in Example 1 to produce the catalyst of the invention, having the following physical properties:

Specific surface area _____ $m^2/g$__ 10.9
Pore volume _____ cc./g__ 0.0109
Average radius of pores _____ A__ 20.0

EXAMPLE 3

$CrF_3 \cdot 3H_2O$ was mixed with 40 weight percent of cerium fluoride of 20 to 90 mesh at the rate of 40 weight percent, and 2 weight percent of graphite based on the combined weight of $CrF_3 \cdot 3H_2O$ and $CeF_3$ were added thereto. The mixture was shaped into tablets, 6 mm. dia. and 6 mm. thick, and was heated in the same manner as in Example 1 to produce the catalyst of the invention, whose physical properties were as follows:

Specific surface area _____ $m^2/g$__ 10.6
Pore volume _____ cc./g__ 0.0110
Average radius of pores _____ A__ 20.7

EXAMPLE 4

$CrF_3 \cdot 3H_2O$ was mixed with 2 weight percent of graphite and shaped into tablets, 6 mm. dia. and 6 mm. thick, which were activated in the same manner as in Example 1 except that water vapor was passed at the rate of 35 to 40 weight percent per 2 hours. The resultant activated chromium fluoride was ground to 20 to 90 mesh, to which was further added technical cerium chloride of 20 to 90 mesh at the rate of 12 weight percent, and 3 weight percent of 20 to 90 mesh particulate polytetrafluoroethylene, and the mixture was shaped into tablets, 6 mm. dia. and 6 mm. thick. (Thechnical cerium chloride is derived from a mixture of lanthanons found in monazite which has the following approximate composition: $CeO_2$ 45%, $Pr_6O_{11}$ 6%, $Sm_2O_3$ 3%, $La_2O_3$ 23%, $Nd_2O_3$ 18% and other lanthanon oxides 5%.) The resultant tablets were heated in the same manner as in Example 1 to produce the catalyst of the invention.

The catalyst so prepared had the following properties:

Specific surface area _____ $m^2/g$__ 11.2
Pore volume _____ cc./g__ 0.0120
Average radius of pores _____ A__ 21.4

For comparison, the comparative catalysts were prepared by the following methods.

Method 1

A mixture of $CrF_3 \cdot 3H_2O$ and 2 weight percent of graphite was shaped into tablets, 6 mm. dia. and 6 mm. thick. 350 g. of said tablets were placed in the activating quartz tube of Example 1 over a length of 225 mm., through which air containing water vapor was passed at a velocity of 2.2 l./min. for 2 hours so as to supply a total amount of 15 weight percent of water vapor. Said catalyst for comparison had the following physical properties:

Specific surface area _____ $m^2/g$__ 12.98
Pore volume _____ cc./g__ 0.0119
Average radius of pores _____ A__ 18.8

Method 2

A mixture of $CeF_3$ and 3 weight percent of particulate polytetrafluoroethylene was made into tablets, 6 mm. dia. and 6 mm. thick, which were heat-treated in a quartz tube in a nitrogen stream at 500° C. for 2 hours. The resultant comparative catalyst had the following physical properties:

Specific surface area _____ $m^2/g$__ 5.9
Pore volume _____ cc./g__ 0.0063
Average radius of pores _____ A__ 21.4

Method 3

350 g. of the tablets of a mixture of $CrF_3 \cdot 3H_2O$ and graphite prepared according to the Method 1 were placed in a quartz tube, through which air was passed at a velocity of 2.2 l./min. for 2 hours for activation. The same activation temperature was applied as Example 1, and the resultant comparative catalyst had the following physical properties:

Specific surface area _____ m.²/g__ 6.15
Pore volume _____ cc./g__ 0.0054
Average radius of pores _____ A__ 17.54

For better understanding of the specific features of the catalyst of the invention the results of fluorinating tetrachloroethylene, $C_2Cl_4$, in the presence of the catalyst of the invention obtained according to the above examples under the following conditions will be given hereinafter in comparison with the results of the comparative catalysts in Table 1 below.

Fluorination of tetrachloroethylene

Vapor-phase fluorination of tetrachloroethylene was carried out by using respectively the present catalysts obtained by Examples 1 to 4 and the comparative catalysts obtained by the above Methods 1 to 3 under the following manner:

150 cc. of each catalyst was loaded into a stainless steel vertical reaction tube of 40 millimeters in inner diameter and 2,000 millimeters in length to give a catalyst bed of 130 mm. deep. The upper part of the tube, 1,000 millimeters in length from the top of the tube, was maintained at 200° C.±10° C. and the lower part, 1,000 millimeters in length, maintained at a temperature specified in Table 2 below by means of an electric furnace surrounding the reaction tube.

Prior to the fluorination reaction, hydrogen fluoride was passed through the bed of the catalyst for 10 minutes, and then the mixture of hydrogen fluoride, chlorine and tetrachloroethylene was passed over the bed of the catalyst under the conditions specified in Table 2 below.

The effluent gas stream from the reactor was washed with water and with an aqueous solution of alkali, dried with calcium chloride, and condensed in a cold-trap. A part of the gas stream dried with calcium chloride, and condensed in a cold-trap. A part of the gas stream dried with $CaCl_2$ was taken out with a syringe for analysis, prior to the condensation.

The utilization rate, mole percent of products, and yield rates appearing in the Table 1 are values found according to the following equations:

Utilization rate =

$$\frac{\text{Number of moles of the starting gas converted into chlorofluoroethane}}{\text{Number of moles of the starting gas fed}} \times 100$$

Mole percent of products =

$$\frac{\text{Number of moles of each product}}{\text{Number of moles of entire product}} \times 100$$

Yield rate of $CClF_2\text{--}CClF_2$ = (Utilization rate of $C_2Cl_4$) × (mole percent of produced $CClF_2\text{--}CClF_2$) ÷ 100
Yield rate of polyfluorinated products = (Utilization rate of $C_2Cl_4$) × (total mole percent of produced $CClF_2\text{--}CCl_2F$, $CClF_2\text{--}CClF_2$ and $CClf_2\text{--}CF_3$) ÷ 100

From the above results it is obvious that a utilization rate of more than 90 percent of tetrachloroethylene can be secured at 330° C. or thereabout in the presence of the catalyst of the invention and polyfluorinated products to which 3 to 5 fluorine atoms are introduced can be obtained at a yield rate as high as 80 to 90 percent, whereas when the comparative catalyst-3 (Method 3) is used the utilization rate of tetrachloroethylene is not more than 77 percent or thereabout even at about 350° C., and that of polyfluorinated products is less than 70 percent, and more than 90 percent of utilization rate can be secured only at 400° C. In the test of the comparative catalyst-2 (Method 2) where cerium fluoride only is employed the utilization rate of tetrachloroethylene and the yield rate of chlorofluoroethane are markedly lower than the catalysts of the invention.

Accordingly, the catalysts of the invention as compared with the conventional catalysts not only offer extremely advantageous application in the industry by securing a high utlization rate of the material and a high yield rate of the desired product at a temperature 70 to 100° C. lower, also lightens the problem of the reactor corroding by HF, $Cl_2$, by-produced HCl, etc.

In comparison with the comparative catalyst-1 (Method 1), particularly $CClF_2CClF_2$ can be obtained at a higher selectivity. Said $CClF_2CClF_2$ is an extremely stable compound and offers a wide range of application for refrigerant, propellant, etc. Thus the catalysts of the invention have advantages of enabling the production of specific fluorinated compounds of value selectively and at a high yield rate.

The results of tests of the catalyst of the invention for their catalyst life are given in Table 2 below. In the test both the catalyst of Example 1 and the comparative catalyst (comparison 3) were employed in the manner same as Table 1, to fluorinate $C_2Cl_4$, and catalyst-life coefficient at each fixed interval of time was sought according to the following equation:

Catalyst-life coefficient =

$$\frac{\text{Yield rate of 3-5 fluorinated compounds at each fixed time after initiation of reaction}}{\text{Yield rate of 3-5 fluorinated compounds produced at the intervals between 1-3 hours after initiation of reaction}} \times 100$$

TABLE 2

| | Time between initiation of reaction and analysis of effluent gas (hr.) | Catalyst-life coefficient | Physical properties of catalyst | | |
|---|---|---|---|---|---|
| | | | Specific surface area (m.²/g.) | Pore volume cc./g. | Average radius of pores (A.) |
| Present cat. | 0 | | 11.3 | 0.0112 | 19.8 |
| | 1~3 | 100 | | | |
| | 28~30 | 94.2 | | | |
| | 58~60 | 92.4 | | | |
| | 88~90 | 90.1 | | | |
| | 308~310 | 86.0 | 7.9 | 0.0084 | 21.2 |
| Comparative cat. | 0 | | 6.15 | 0.0054 | 17.5 |
| | 1~3 | 100 | | | |
| | 28~30 | 92.1 | | | |
| | 58~60 | 87.2 | | | |
| | 68~70 | 86.0 | 3.65 | 0.0035 | 19.2 |

TABLE 1

| No. | Cat. | Reaction temp. (° C.) | Mole ratio, $C_2Cl_4$/HF/$Cl_2$ | Contact utilization rate (percent) | | | | Mole percent of products | | | | | Yield rate | |
|---|---|---|---|---|---|---|---|---|---|---|---|---|---|---|
| | | | | Time (sec.) | $C_2Cl_4$ | HF | $Cl_2$ | $CCl_2F\text{--}CCl_3$ | $CCl_2F\text{--}CCl_2F$ | $CCl_2F\text{--}CClF$ | $CClF_2\text{--}CClF_2$ | $CF_3\text{--}CClF_2$ | $CClF_2\text{--}CClF_2$ | Polyfluorinated products |
| 1 | Ex. 1a | 330±10 | 1/3.97/1.17 | 2.97 | 92.73 | 88.09 | 78.77 | 0.3 | 4.7 | 17.3 | 75.4 | 2.3 | 69.9 | 88.1 |
| 2 | Ex. 2a | 330±10 | 1/4.1/1.17 | 3.02 | 91.88 | 84.46 | 77.9 | 0.2 | 5.3 | 18.5 | 73.7 | 2.3 | 67.7 | 86.8 |
| 3 | Ex. 3a | 330±10 | 1/4.36/1.1 | 3.01 | 87.1 | 75.34 | 79.0 | 0.1 | 1.5 | 14.6 | 75.1 | 8.7 | 65.4 | 85.7 |
| 4 | Ex. 4a | 330±10 | 1/4.07/1.15 | 3.10 | 90.9 | 83.92 | 79.37 | 0.1 | 4.8 | 17.1 | 75.8 | 2.2 | 68.9 | 86.4 |
| 5 | Method 1b | 330±10 | 1/4.03/1.08 | 2.8 | 87.14 | 81.23 | 85.45 | | 8.4 | 20.8 | 58.2 | 12.6 | 50.7 | 79.8 |
| 6 | Method 2b | 330±10 | 1/4.05/1.1 | 3.02 | 67.32 | 57.41 | 67.47 | 0.2 | 16.0 | 35.9 | 43.2 | 4.7 | 29.0 | 56.4 |
| 7 | Method 3b | 300±10 | 1/4.04/1.0 | 3.0 | 67.54 | 61.9 | 67.29 | 0.2 | 8.1 | 31.8 | 55.7 | 4.2 | 37.6 | 61.9 |
| 8 | do.b | 350±10 | 1/4.07/1.0 | 2.98 | 77.0 | 69.0 | 77.4 | 0.2 | 12.1 | 24.5 | 50.5 | 12.7 | 38.8 | 67.5 |
| 9 | do.b | 400±10 | 1/4.17/1.0 | 3.02 | 90.5 | 84.8 | 89.4 | 0.4 | 9.8 | 18.3 | 52.0 | 19.5 | 47.0 | 81.2 | a Present cat.   b Comparative cat.

From the above results it will be apparent that the catalyst of the invention has such a longer life that the life coefficient thereof about 300 hours after initiation of reaction corresponds substantially with that of the publicly known catalyst for comparison, only 70 hours after initiation of the reaction, and this long life and a high activity as shown in Table 1 afford extremely high industrial advantages.

What we claim is:

1. An improved fluorination catalyst comprising an activated amorphous chromium oxyfluoride prepared by heating a chromium fluoride at from 300° to 750° C. while supplying thereto a continuous stream of a gas mixture containing molecular oxygen and water vapor, said water vapor being supplied in the range of at least 2 weight percent in total amount, based on the weight reduced to anhydrous chromium fluoride, and 1 to 50 weight percent of at least one rare earth compound selected from the group consisting of a rare earth fluoride, rare earth chloride and rare earth oxide, based on the weight reduced to anhydrous chromium fluoride.

2. The improved fluorination catalyst of claim 1, in which said chromium fluoride to be activated is trihydrate of chromium fluoride.

3. The improved fluorination catalyst of claim 1, in which said chromium fluoride to be activated is anhydrous chromium fluoride.

4. The improved fluorination catalyst of claim 1, in which said rare earth compound is cerium fluoride.

5. The improved fluorination catalyst of claim 1, in which said rare earth compound is cerium chloride.

6. The improved fluorination catalyst of claim 1, in which said rare earth compound is contained in the range of from 5 to 30 weight percent, based on the weight reduced to anhydrous chromium fluoride.

7. A process for preparing the fluorination catalyst of claim 1 comprising heating a chromium fluoride at from 300° to 750° C. while supplying thereto a continuous stream of a gas mixture containing molecular oxygen and water vapor, said water vapor being supplied in the range of at least 2 weight percent, based on the weight reduced to anhydrous chromium fluoride, mixing the resultant activated amorphous chromium oxyfluoride with a polymeric binder and at least one member of the group consisting of rare earth fluoride, rare earth chloride and rare earth oxide, shaping the mixture into small pieces and heating the pieces at a temperature sufficiently high to decompose the polymeric binder.

8. The process of claim 7, in which polymeric binder is polytetrafluoroethylene.

9. A process for preparing the fluorination catalyst of claim 1, comprising mixing a chromium fluoride with at least one member of the group consisting of rare earth fluorides, rare earth chlorides and rare earth oxides and at least one member of graphite and silicon dioxide, shaping the mixture into small pieces and heating the pieces at 300° to 750° C. while supplying thereto a continuous stream of a gas mixture containing molecular oxygen and water vapor, said water vapor being supplied in the range of at least 2 weight percent, based on the weight reduced to anhydrous chromium fluoride.

References Cited

UNITED STATES PATENTS

| | | | |
|---|---|---|---|
| 3,346,421 | 10/1967 | Thompson | 136—120 |
| 2,745,867 | 5/1956 | Ruh | 260—465.7 |
| 3,294,852 | 12/1966 | Vecchio | 260—653.7 |

PATRICK P. GARVIN, Primary Examiner

U.S. Cl. X.R.

252—429; 260—653.3, 653.7